United States Patent
Shen et al.

(10) Patent No.: US 11,650,737 B2
(45) Date of Patent: May 16, 2023

(54) DISK OFFSET-DISTANCE AWARENESS DATA PLACEMENT FOR STORAGE SYSTEM DATA PROTECTION

(71) Applicant: International Business Machines Corporation, Armonk, NY (US)

(72) Inventors: Lin Feng Shen, Beijing (CN); Ji Dong Li, Beijing (CN); Yong Zheng, Beijing (CN); Guang Han Sui, Beijing (CN); Shuo Feng, Beijing (CN); Hai Zhong Zhou, Beijing (CN); Yu Bing Tang, Beijing (CN); Wu Xu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 77 days.

(21) Appl. No.: 16/695,246

(22) Filed: Nov. 26, 2019

(65) Prior Publication Data

US 2021/0157488 A1  May 27, 2021

(51) Int. Cl.
*G06F 3/06* (2006.01)
*G06F 12/0871* (2016.01)

(52) U.S. Cl.
CPC ............ *G06F 3/0619* (2013.01); *G06F 3/064* (2013.01); *G06F 3/0689* (2013.01); *G06F 12/0871* (2013.01)

(58) Field of Classification Search
CPC ....... G06F 3/0619; G06F 3/0689; G06F 3/064
See application file for complete search history.

(56) References Cited

U.S. PATENT DOCUMENTS

| 5,708,632 A * | 1/1998 | Totsuka ............... G06F 3/0613 |
| | | 369/30.03 |
| 9,436,394 B2 | 9/2016 | Tal |
| 9,582,363 B2 | 2/2017 | Becker-Szendy |

(Continued)

FOREIGN PATENT DOCUMENTS

MD  58 B1  8/1994

OTHER PUBLICATIONS

Anonymous, "System and method to improve rebuild performance of distributed RAID," IP.com, Disclosure No. IPCOM000248791D, Jan. 12, 2017, 7 pages. <https://priorart.ip.com/IPCOM/000248791>.

*Primary Examiner* — David Yi
*Assistant Examiner* — Nicholas A. Paperno
(74) *Attorney, Agent, or Firm* — Scott S. Dobson

(57) ABSTRACT

A computer-implemented method comprises initializing a plurality of segment lists. Each segment list of the plurality of segment lists corresponds to a respective one of a plurality of disk drives. Each segment list divides storage space of the respective disk drive into a plurality of segments. The method further comprises, for each of the plurality of disk drives, identifying one or more candidate segments from the plurality of segments; calculating a respective segment distance variance for one or more combinations of identified candidate segments. Each combination of identified candidate segments includes one candidate segment for each of the plurality of disk drives. The method further comprises selecting a combination of the one or more combinations of identified candidate segments having the smallest respective segment distance variance; and storing data on the plurality of disk drives according to the selected combination of identified candidate segments.

20 Claims, 5 Drawing Sheets

(56) References Cited

U.S. PATENT DOCUMENTS

| | | | |
|---|---|---|---|
| 2002/0060867 A1* | 5/2002 | Enokida | G11B 5/596 360/31 |
| 2004/0148543 A1* | 7/2004 | Eto | G11B 27/329 714/5.1 |
| 2008/0301256 A1* | 12/2008 | McWilliams | G06F 12/0806 709/214 |
| 2015/0205663 A1 | 7/2015 | Sundaram | |
| 2017/0199695 A1* | 7/2017 | Robins | G06F 11/1088 |
| 2018/0018096 A1* | 1/2018 | Fekete | G06F 3/0649 |

* cited by examiner

DISK OFFSET-DISTANCE AWARENESS DATA PLACEMENT FOR STORAGE SYSTEM DATA PROTECTION

BACKGROUND

Storage systems often include servers that involve various hardware such as data storage media, storage controllers, memories, and the accompanying power systems, cooling systems, etc. Additionally, storage controllers are often utilized to control access to data storage media and memories in response to read and write requests. The storage controllers may direct the data in accordance with data storage technologies such as RAID (redundant array of independent disks), JBOD (just a bunch of disks), and other redundancy and security levels.

SUMMARY

Aspects of the disclosure may include a computer-implemented method, computer program product, and system. One example of the computer-implemented method comprises initializing a plurality of segment lists. Each segment list of the plurality of segment lists corresponds to a respective one of a plurality of disk drives. Each segment list divides storage space of the respective disk drive into a plurality of segments. The method further comprises, for each of the plurality of disk drives, identifying one or more candidate segments from the plurality of segments; calculating a respective segment distance variance for one or more combinations of identified candidate segments. Each combination of identified candidate segments includes one candidate segment for each of the plurality of disk drives. The method further comprises selecting a combination of the one or more combinations of identified candidate segments having the smallest respective segment distance variance; and storing data on the plurality of disk drives according to the selected combination of identified candidate segments.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
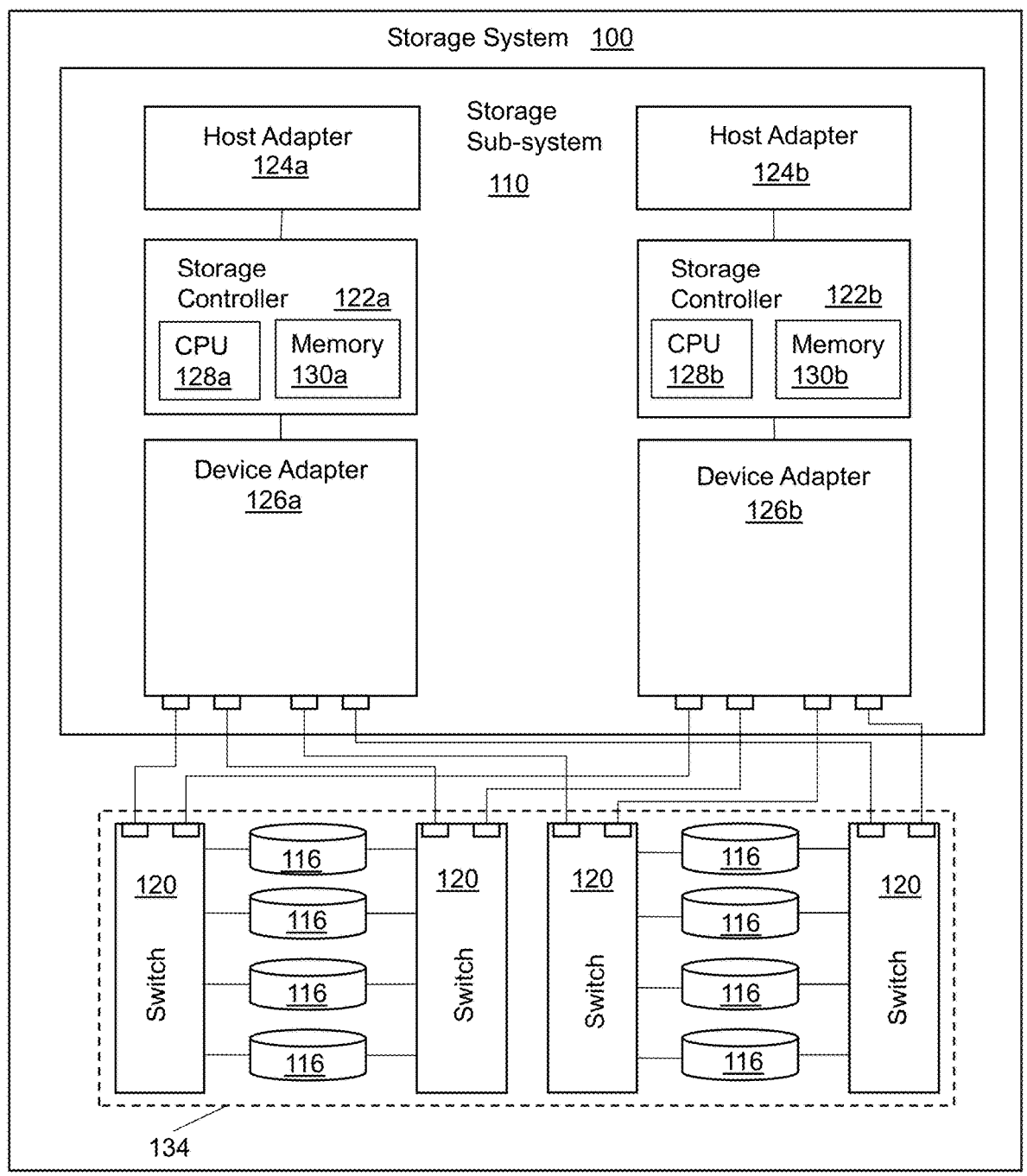
FIG. 1 is a high-level block diagram of one embodiment of an example storage system.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

As used herein, the phrases "at least one", "one or more," and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. Additionally, the term "a" or "an" entity refers to one or more of that entity. As such, the terms "a" (or "an"), "one or more" and "at least one" can be used interchangeably herein. It is also to be noted that the terms "comprising," "including," and "having" can be used interchangeably. The term "automatic" and variations thereof, as used herein, refers to any process or operation done without material human input when the process or operation is performed. Human input is deemed to be material if such input directs or controls how or when the process or operation is performed. A process which uses human input is still deemed automatic if the input does not direct or control how or when the process is executed.

The terms "determine", "calculate" and "compute," and variations thereof, as used herein, are used interchangeably and include any type of methodology, process, mathematical operation or technique. Hereinafter, "in communication" or "communicatively coupled" shall mean any electrical connection, whether wireless or wired, that allows two or more systems, components, modules, devices, etc. to exchange data, signals, or other information using any protocol or format. Furthermore, two components that are communicatively coupled need not be directly coupled to one another, but can also be coupled together via other intermediate components or devices.

Various techniques can be used for data protection in a storage system. One storage technology, for example, which can be used for data protection is redundant array of independent disks (RAID) technology which utilize various erasure coding algorithms, such as Reed-Solomon coding algorithms. Although the following description discusses RAID technology for purposes of explanation, it is to be understood that other technologies, such as but not limited to JBOD, can be used in lieu of or in addition to RAID technology. RAID technology can be used to protect data across multiple drives with different RAID levels. Many conventional RAID systems use clustered RAID. In a clustered RAID array, a group of disks is grouped together and dedicated for a given set of data. For example, a RAID array of 7 discs can be grouped into 3 arrays of 2 discs in each array with a spare disk. Each of the 3 arrays can store a dedicated set of data. For example, a first set is stored on the first array of 2 discs, a second set is stored on the second array, and a third set is stored on the third array. However, clustered RAID can confine a storage volume across a smaller set of physical disc drives and can involve a large rebuild overhead and longer rebuild time compared to other RAID configurations.

For example, another RAID configuration is referred to as declustered RAID. In declustered RAID, the data, parity, and spare strips are distributed evenly over all disks in a Declustered Array (DA). Thus, multiple RAID volumes share and span across all the drives in the same DA. In this way, declustered RAID can leverage more drives for faster rebuild time compared to a clustered RAID. However, in both clustered and declustered RAID, the individual disk drive is considered the smallest failure unit. As such, many storage systems use the beginning of each disk drive for metadata. Additionally, a RAID volume typically does not layout the data with a disk offset specifically chosen for the disk drives. Rather, the RAID volume typically uses partitions on the disk drives with the same, similar or random offsets in different disk drives.

The above behavior of typical storage systems can lead to data loss in some situations. For example, an administrator or disk management software can perform an error or mis-operation that corrupts the data resulting in failure of the storage system service. Such errors can include an administrator or disk management software formatting a disk drive for another file system by mistake. For example, the linux dd command could be executed by accident with a typographical error in the command resulting in wiping out data on one or more disks before the error is noticed. Since the RAID volumes in conventional systems do not layout the data with a specifically chosen disk offset, redundant copies of data, for example, can be located in corresponding segments of different disks. Thus, in some situations, errors such as those discussed above, can affect the same segments on multiple disk drives. For example, in some conventional systems, metadata is stored at the beginning of each disk drive, as mentioned above. If an error corrupts the beginning of multiple drives in the RAID volume, then each of the redundant copies of the metadata is at risk for being corrupted which would result in data loss. The embodiments described herein help mitigate such data loss by configuring the system to selectively assign disk offsets, as described in more detail below.

FIG. 1 is a high-level block diagram of one embodiment of an example storage system 100. Storage system 100 can be part of a direct-attached storage system, network-attached storage system or a storage-area-network (SAN). It is to be understood that storage system 100 is provided by way of example only and that other architectures can be used in other embodiments.

Storage system 100 includes one or more arrays of storage drives (e.g., hard-disk drives and/or solid-state drives). As shown, the storage system 100 includes a storage sub-system 110, a plurality of switches 102, and a plurality of storage drives 116 such as hard disk drives and/or solid-state drives (such as flash-memory-based drives). The storage sub-system 110 may enable one or more hosts (e.g., open system and/or mainframe servers) to access data in the plurality of storage drives 116.

In some embodiments, the storage sub-system 110 includes one or more storage controllers 122. In the example shown in FIG. 1, the storage sub-system includes storage controller 122a and storage controller 122b. Although only two storage controllers 126 are shown herein for purposes of explanation, it is to be understood that more than two storage controllers can be used in other embodiments. The storage sub-system 110 in FIG. 1 also includes host adapters 124a, 124b and device adapters 126a, 126b to connect the storage sub-system 110 to host devices and storage drives 116, respectively. Multiple storage controllers 122a, 122b provide redundancy to help ensure that data is available to connected hosts. Thus, when one storage controller (e.g. storage controller 122a) fails, the other storage controller (e.g. 122b) can pick up the I/O load of the failed storage controller to ensure that I/O is able to continue between the hosts and the storage drives 116. This process can be referred to as a "failover."

Each storage controller 122 can include respective one or more processors 128 and memory 130. The memory 130 can include volatile memory (e.g., RAM) as well as non-volatile memory (e.g., ROM, EPROM, EEPROM, flash memory, etc.). The volatile and non-volatile memory can store software modules that run on the processor(s) 128 and are used to access data in the storage drives 116. The storage controllers 122 can host at least one instance of these software modules. These software modules can manage all read and write requests to logical volumes in the storage drives 116.

In particular, each storage controller 122 is communicatively coupled to the storage drives 116 via a respective device adapter 126. Each device adapter 126 is configured to manage Input/Output (I/O) accesses to the storage drives 116. The storage drives 116 (also referred to as disk drive modules (DDM)) can include groups of different types of drives having different performance characteristics. For example, the storage drives 116 can include a combination of (relatively) slow 'nearline' disks (e.g. 7,200 revolutions per minute (RPM) rotational speed), SAS disk drives (e.g. 10 k or 15 k RPM) and relatively fast solid state drives (SSD).

The device adapters 126 are coupled to the storage drives 116 via switches 120. Each of the switches 120 can be fiber switches coupling the storage drives 116 to the device adapters via fiber optic connections. The device adapters 126 logically group the storage drives 116 into array sites 134. For purposes of illustration, a single array site 134 comprised of storage drives 116 is depicted in FIG. 1. However, it is to be understood that more than one array site comprised of storage drives 116 can be included in other embodiments. The array site 134 can be formatted as a Redundant Array of Independent Disks (RAID) array 134. It is to be understood that any type of RAID array (e.g. RAID 0, RAID 5, RAID 10, etc.) can be used. Each RAID array is also referred to as a rank. Each rank is divided into a number of equally sized partitions referred to as extents. The size of each extent can vary based on the implementation. For example, the size of each extent can depend, at least in part, on the extent storage type. The extent storage type (e.g. Fixed Block (FB) or count key data (CKD)) is dependent on the type of host coupled to the storage sub-system (e.g. open-systems host or mainframe server). The extents are then grouped to make up logical volumes.

The storage controllers 122 are configured to implement a data layout scheme that distributes RAID volumes to a bunch of disk drives. Each RAID volume is placed among these drives with disk offset distances selected to protect against data corruption. The data partitions of the RAID volumes are placed evenly among all drives and inside each drive, in some embodiments. The storage controllers 122 are configured to divide each disk drive into multiple segments. In particular, in this embodiment, each disk drive is divided into multiple segments with each segment having the same size. In some embodiments, the number of segments into which each disk drive is divided is more than or equal to the maximum code width of all supported RAID code. For example, in a mixed storage system utilizing 8+2p and 16+4p, each disk drive is divided into at least 20 segments. With large capacity disk drives (e.g. greater than or equal to 10 TB), each segment still has hundreds of GB of space. Additionally, each segment is assigned a respective free space counter F(segment-index). For example, F(4) is the free space counter for segment 4.

Figure 2:
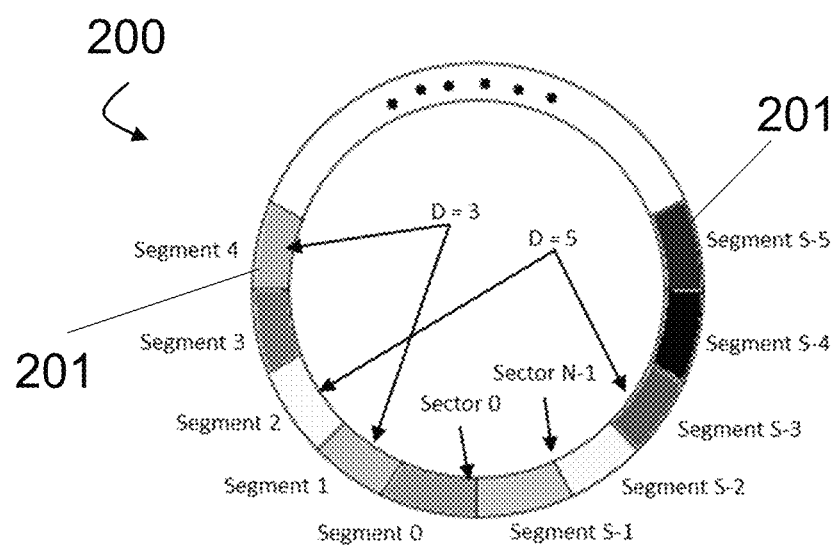
FIG. 2 is an example depiction of a disk drive as a ring buffer.

The storage controllers 122 are further configured to define a disk segment distance (also referred to herein as a disk offset distance). In particular, in this embodiment, the storage controllers are configured to logically view the disk drive space as a ring buffer. An example depiction of a disk drive 200 as a ring buffer is shown in FIG. 2. The disk drive 200 includes a plurality of segments 201. The segments 201 are also labelled segment 0 through segment S-1, where S is the total number of segments. The storage controllers 122 choose two segments 201 and calculate a segment distance between the two segments. In this example, the segment distance is calculated in a clockwise order. However, in other embodiments, the segment distance can be calculated in a counter-clockwise order.

To calculate the disk offset distance (i.e. segment distance) between two segments, the storage controllers 122 select a first segment (e.g. segment 1 or segment S-3 shown in FIG. 2) and a second segment (e.g. segment 4 or segment 2 shown in FIG. 2). The offset distance is computed using the following equation in some embodiments. In the following equation, the first segment is given the index A and the second segment is given the index B.

$$D(A,B)=(B-A+S) \bmod S$$

Using the above equation with segments 1 and 4, the offset distance is calculated to be 3. Using the above equation with segment S-3 and 2, the offset distance is calculated to be 5. It is to be understood that other equations or ways of calculating the offset distance can be used in other embodiments. Additionally, the offset distance is applicable to two segments in two different disk drives with the same size.

Using the offset distance, as described above, the storage controllers 122 calculate a disk segment distance variance (also referred to herein as a disk offset distance variance). The disk segment distance variance is used to determine the location for storing data across the disk drives, as described below. The disk segment distance variance is calculated, in some embodiments, using the following equation.

$$\delta^2 = \frac{\sum (X-\mu)^2}{N}$$

Figure 3:
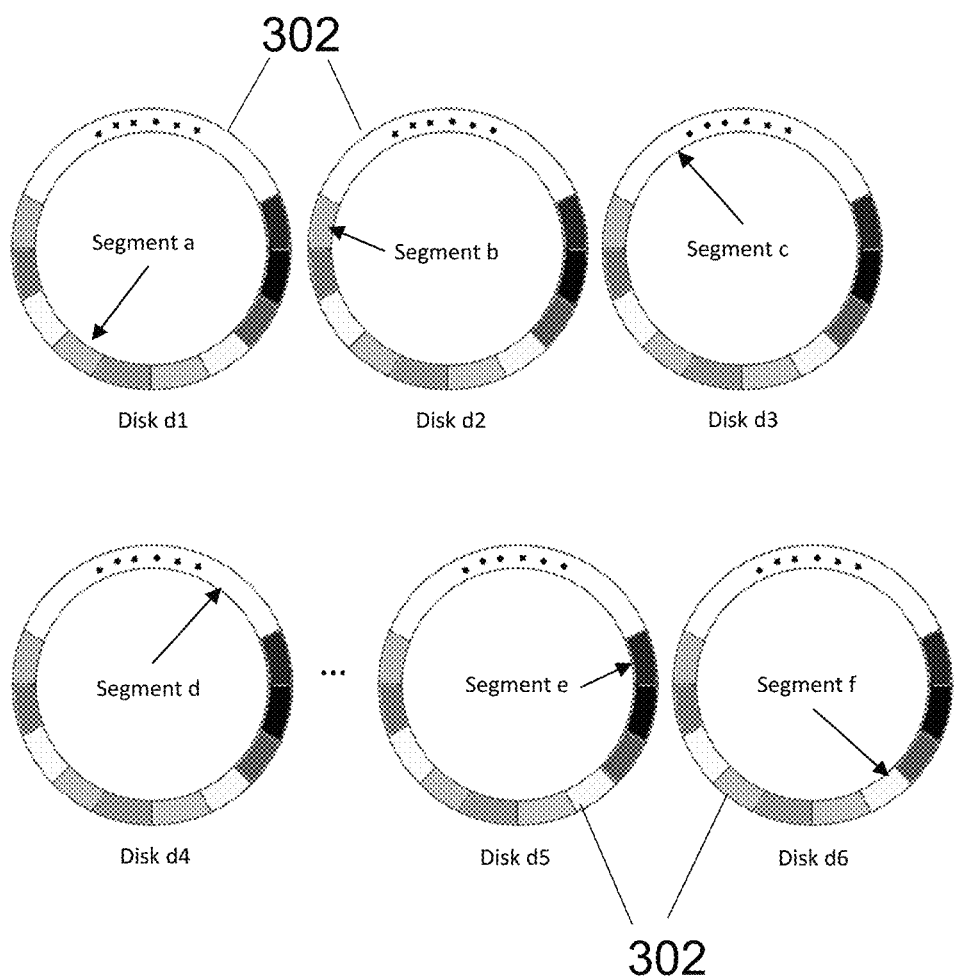
FIG. 3 depicts an example embodiment depicting six disk drives as ring buffers.

In the above equation, $\delta^2$ is the disk segment distance variance, X is a variable for all segment distances between two neighbor disks. For example, X is a variable for the segment distances D(a,b), D(b,c), D(c,d), D(d,e), D(e,f), and D(f,a) in the example embodiment shown in FIG. 3. In particular, FIG. 3 depicts an example with six disks 302: d1, d2, d3, d4, d5, d6. Although it is to be understood that in other embodiments, other numbers of disks 302 can be used. On each disk 302 in FIG. 3, one segment is labelled (e.g. segment a, segment b, etc.). Additionally, in the above equation, N is the total number of segment distances calculated and $\mu$ is the average/expected segment distance. For example, $\mu$ can be calculated as the total number of segments on a disk divided by the code width. For example, for a RAID code 4+2p and a total number of 20 segments on a disk, $\mu$ would be 20/6.

The storage controllers 122 are configured to utilize the disk segment distance variance to determine a layout for the disks to store the redundant copies of data. By using the disk segment distance and disk segment distance variance, the storage controllers 122 enable the system to offset the redundant copies sufficiently on different disks that, should corresponding segments of different disk drives be corrupted or erased, the remaining copies of the redundant data are likely not affected. For example, using the techniques described herein, metadata can be stored in a first segment at the beginning of a first disk and the redundant copies stored on other disks are offset from each other such that if the data in the first segment of each of a plurality of disk drives is corrupted or erased, the remaining redundant copies are not likely corrupted because they are stored with a calculated offset on the other disk drives.

Figure 4:
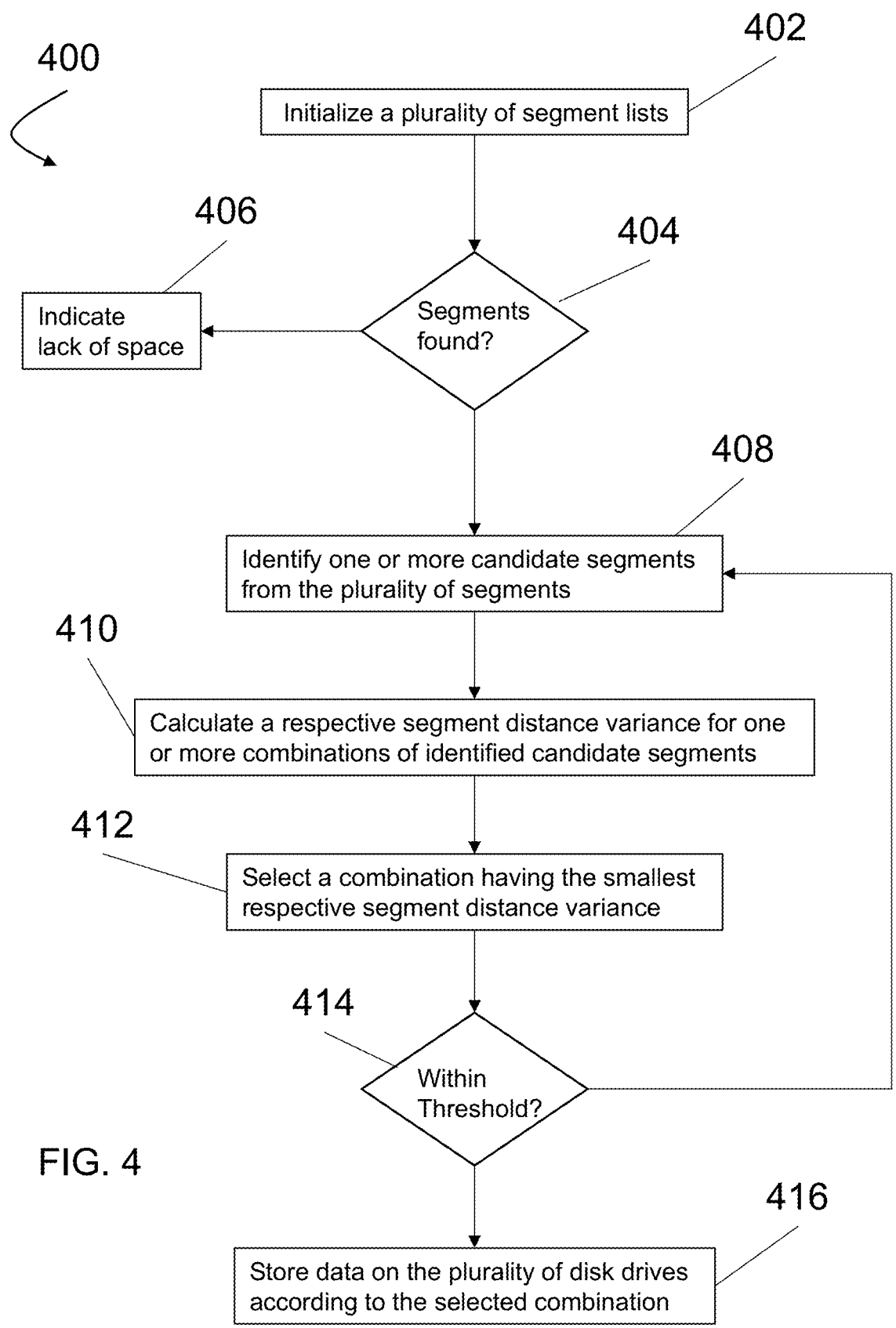
FIG. 4 is a flow-chart depicting one embodiment of an example method of determining locations for data in a storage system

FIG. 4 depicts one embodiment of an example method 400 of determining locations for data in a storage system. The method 400 can be implemented by a storage controller, such as storage controllers 122. For example, the method 400 can be implemented by a CPU, such as CPU 505 in computing device 500, executing instructions, such as disk offset instructions 501. It is to be understood that the order of actions in example method 400 is provided for purposes of explanation and that the method can be performed in a different order in other embodiments. Similarly, it is to be understood that some actions can be omitted or additional actions can be included in other embodiments.

At block 402, a plurality of segment lists are initialized. Each segment list corresponds to a respective one of a plurality of disk drives. The plurality of disk drives are a subset of disk drives in a disk group of a storage system (e.g. a RAID array) in some embodiments. For example, the plurality of disk drives can include one or more drives for each of a plurality of redundant copies of data. For example, for storing 3 redundant copies of data, there can be 3 or more disk drives selected from the total number of disk drives in the disk group of the storage system. It is to be understood that the disk drives can be selected using any suitable technique for selecting disk drives to store data. For example, the disk drives can be selected using techniques to increase fault tolerance, to provide more even space usage across the disk group, etc.

Additionally, initializing the segment list for each disk drive includes dividing the storage space of the disk drive into a plurality of segments. In particular, in some embodiments, the storage space is divided into a plurality of equally sized segments. That is, the segments can be equally sized within a given disk drive as well as the same size as segments of another disk drive. Additionally, each of the disk drives can be of the same size. Furthermore, in some embodiments, initializing the segment list for each disk drive includes organizing the plurality of segments of the disk drive into a ring buffer and assigning a respective index number to each of the plurality of segments of the disk drive. In some such embodiments, the index numbers are assigned in a clockwise order.

At block 404, it is determined if available segments were found on the plurality of disk drives based on the initialized segment list. In other words, it is determined if there are segments which are not already being utilized or that have sufficient space for the data to be stored. If it is determined that no segments or insufficient segments are found, the method 400 can end at block 406 where an indication can be provided that there were not segments found. This can be a notification output to a user via a display screen, an audio speaker, etc., in some embodiments. In other embodiments, the indication can be provided to another computer system or program being executed that is configured to select the disk drives. In this way, a different set of disk drives can be selected from a disk group to search for suitable segments for storing the data.

If it is determined that sufficient segments are found at block 404, the method 400 continues at block 408. At block 408, one or more candidate segments from the plurality of segments for each of the plurality of disk drives are identified. In some embodiments, the segments having the least usage are identified. In other words, a segment for each disk drive having the least usage is selected. In some embodiments, more than one segment for each disk drive can be selected, such as when two or more segments have the same usage or utilization. Additionally, in some embodiments, the candidate segments can be selected based on segment distances or disk offset distances corresponding to the candidate segments. For example, as discussed above, a disk offset distance between a candidate segment and any other segment can be calculated, as discussed above, based on a difference between the assigned index numbers of the candidate segment and the other segment.

In some embodiments, the identified candidate segments for each respective disk drive are removed from the corresponding initialized segment list. Removing the identified candidate segments from the respective initialized segment list enables the storage controller to spread data across the segments of the disk drives rather than always considering the same set of segments which could result in overuse of a given segment. However, in other embodiments, the identified candidate segments are not removed from the respective initialized segment list.

At block 410, a respective segment distance variance for one or more combinations of the identified candidate segments is calculated. Each combination of identified candidate segments includes one candidate segment for each of the plurality of disk drives. Thus, a plurality of combinations can be created when more than one candidate segment is identified for at least one of the disk drives. A respective segment distance variance is calculated for each of the possible combinations of identified candidate segments based on corresponding segment distances. The respective segment distance variance can be calculated, as discussed above, for each of the possible combinations.

At block 412, at least one combination of the one or more combinations of identified candidate segments is selected. In particular, at least one combination having the smallest respective segment distance variance is selected in some embodiments. Thus, method 400 can identify candidate segments which increase the segment distance as well as select combinations of candidate segments which reduce and, in some embodiments, minimize the segment distance variance. Thus, the embodiments described herein provide increased protection for data, evenly distributed the data between disk drives so as to have more even distance between segments of different disk drives, and balance the space usage among all segments inside the same disk drive. For example, by reducing the segment distance variance, the data is stored more evenly across the disk drives. Additionally, by increasing the segment distance between segments, more protection is provided for the data should an error occur, such as those discussed above. In some embodiments, two or more of the combinations may have the same segment distance variance. In some such embodiments, one of the two or more combinations is selected randomly.

At block 414, a variance threshold is applied in some embodiments. That is, in some embodiments, the segment distance variance for each of the at least one selected combinations is compared to a variance threshold. If the segment distance variance is not within the variance threshold, the method 400 returns to block 408 to identify additional candidate segments. The variance threshold can be used in some embodiments to place a bound on the size of the segment distance variance such that only combinations which have at most the threshold variance are used. Thus, the variance threshold can provide control on evenly spacing the data across the disk drives.

At block 416, the data is stored on the disk drives according to the selected combination of identified candidate segments. For example, each redundant copy is stored on one of the disk drives in the corresponding candidate segment of the selected combination. In this way, the redundant copies are stored in different locations of the disk drives so that if one of the copies is corrupted, the other copies on other disk drives are likely not affected even if the same location of all the disk drives is corrupted or erased since the different copies are stored in different segments of the disk drives. Furthermore, although the above discussion relates to redundant copies, it is to be understood that the techniques described above are also applicable to other data protections techniques such as storing parity data, etc. for different erasure coding algorithms in addition to or in lieu of using redundant copies.

Figure 5:
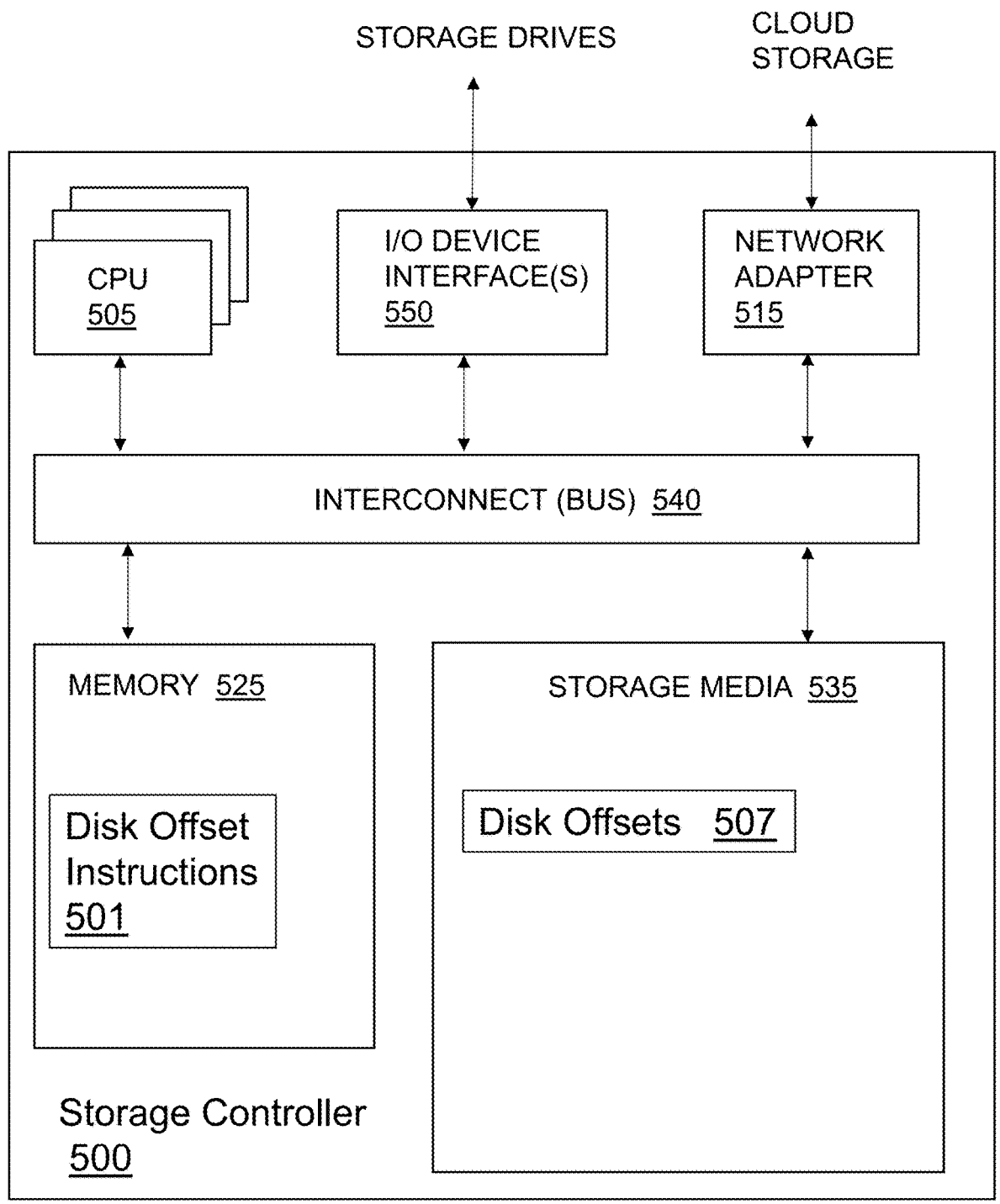
FIG. 5 is a block diagram of one embodiment of an example storage controller.

FIG. 5 is a block diagram of one embodiment of an example storage controller 500. The storage controllers 122 can be implemented similar to storage controller 500 in some embodiments. In the example shown in FIG. 5, the storage controller 500 includes a memory 525, storage 535, an interconnect (e.g., BUS) 540, one or more processors 505 (also referred to as CPU 305 herein), an I/O device interface 550, and a network adapter or port 515.

Each CPU 505 retrieves and executes programming instructions stored in the memory 525 and/or storage 535. The interconnect 540 is used to move data, such as programming instructions, between the CPU 505, I/O device interface 550, storage 535, network adapter 515, and memory 525. The interconnect 540 can be implemented using one or more busses. The CPUs 505 can be a single CPU, multiple CPUs, or a single CPU having multiple processing cores in various embodiments. In some embodiments, a processor 505 can be a digital signal processor (DSP). Memory 525 is generally included to be representative of a random access memory (e.g., static random access memory (SRAM), dynamic random access memory (DRAM), or Flash). The storage 535 is generally included to be representative of a non-volatile memory, such as a hard disk drive, solid state device (SSD), removable memory cards, optical storage, or flash memory devices.

In some embodiments, the memory 525 stores disk offset instructions 501 and the storage 535 stores disk offsets 507. However, in various embodiments, the disk offset instructions 501 and the disk offsets 507 are stored partially in memory 525 and partially in storage 535, or they are stored entirely in memory 525 or entirely in storage 535.

When executed by the CPU 505, the disk offset instructions 501 cause the CPU 505 to calculate the disk offsets 507 and the disk segment distance variance, as discussed above. In addition, the disk offset instructions 501 cause the CPU 505 to select a disk offset and disk segment distance variance to determine a layout of the disk drives for storing data, as discussed above. In particular, the disk offset instructions 501 cause the CPU 505 to perform a method such as method 400 discussed above to determine a layout of the disk drives.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A computer-implemented method comprising:
   initializing a plurality of segment lists, each segment list of the plurality of segment lists corresponding to a respective one of a plurality of disk drives, wherein each segment list divides storage space of the respective disk drive into a plurality of segments;
   for each of the plurality of disk drives, identifying one or more candidate segments from the plurality of segments;
   calculating a respective segment distance variance for one or more combinations of identified candidate segments, wherein each combination of identified candidate segments includes one candidate segment for each of the plurality of disk drives, wherein the respective segment distance variance is calculated with respect to an average segment distance representing data spread equidistant around an entirety of a disk drive such that the segment distance variance would be minimized with an equidistant spread of the segments around the disk drives in a combination;
   selecting a combination of the one or more combinations of identified candidate segments having the smallest respective segment distance variance; and
   storing data on the plurality of disk drives according to the selected combination of identified candidate segments.

2. The computer-implemented method of claim 1, wherein each segment lists divides the storage space of the respective disk drive into a plurality of equally sized segments.

3. The computer-implemented method of claim 1, wherein identifying one or more candidate segments includes, for each of the plurality of disk drives, identifying one or more candidate segments having the least usage.

4. The computer-implemented method of claim 1, wherein the plurality of disk drives are a subset of disk drives included in a redundant array of independent disks (RAID) array.

5. The computer-implemented method of claim 1, further comprising removing the one or more identified candidate segments for each respective disk drive from the corresponding initialized segment list.

6. The computer-implemented method of claim 1, wherein each segment list organizes the plurality of segments of the respective disk drive into a ring buffer and assigns a respective index number to each of the plurality of segments of the respective disk drive in clockwise order; and
   wherein the method further comprises calculating respective segment distances between identified candidate segments of each of the one or more combinations based on differences between assigned index numbers of the identified candidate segments.

7. The computer-implemented method of claim 6, wherein identifying the one or more candidate segments from the plurality of segments further comprises identifying the one or more candidate segments based on respective segment distances associated with the one or more candidate segments.

8. A storage system comprising:
   a plurality of disk drives; and
   a storage controller comprising a processor and a memory, the storage controller communicatively coupled to the plurality of disk drives and configured to:
   initialize a plurality of segment lists, each segment list of the plurality of segment lists corresponding to a respective one of a plurality of disk drives, wherein each segment list divides storage space of the respective disk drive into a plurality of segments;
   identify, for each of the plurality of disk drives, one or more candidate segments from the plurality of segments;
   calculate a respective segment distance variance for one or more combinations of identified candidate segments, wherein each combination of identified candidate segments includes one candidate segment for each of the plurality of disk drives;
   select a combination of the one or more combinations of identified candidate segments having the smallest respective segment distance variance; and
   store data on the plurality of disk drives according to the selected combination of identified candidate segments.

9. The storage system of claim 8, wherein each segment lists divides the storage space of the respective disk drive into a plurality of equally sized segments.

10. The storage system of claim 8, wherein the storage controller is configured to identify one or more candidate segments having the least usage for each of the plurality of disk drives.

11. The storage system of claim 8, wherein the plurality of disk drives are a subset of disk drives included in a redundant array of independent disks (RAID) array.

12. The storage system of claim 8, wherein the storage controller is further configured to remove the one or more identified candidate segments for each respective disk drive from the corresponding initialized segment list.

13. The storage system of claim 8, wherein the storage controller is configured to organize the plurality of segments of the respective disk drive into a ring buffer and assign a respective index number to each of the plurality of segments of the respective disk drive in clockwise order; and
   wherein the storage controller is further configured to calculate respective segment distances between identified candidate segments of each of the one or more combinations based on differences between assigned index numbers of the identified candidate segments.

14. The storage system of claim 13, wherein the storage controller is further configured to identify the one or more candidate segments from the plurality of segments by identifying the one or more candidate segments based on respective segment distances associated with the one or more candidate segments.

15. A computer program product comprising a computer readable storage medium having a computer readable program stored therein, wherein the computer readable program, when executed by a processor, causes the processor to:
   initialize a plurality of segment lists, each segment list of the plurality of segment lists corresponding to a respective one of a plurality of disk drives, wherein each segment list divides storage space of the respective disk drive into a plurality of segments;
   identify, for each of the plurality of disk drives, one or more candidate segments from the plurality of segments;
   calculate a respective segment distance variance for one or more combinations of identified candidate segments, wherein each combination of identified candidate segments includes one candidate segment for each of the plurality of disk drives;
   select a combination of the one or more combinations of identified candidate segments having the smallest respective segment distance variance; and store data on the plurality of disk drives according to the selected combination of identified candidate segments.

16. The computer program product of claim 15, wherein each segment lists divides the storage space of the respective disk drive into a plurality of equally sized segments.

17. The computer program product of claim 15, wherein the computer readable program is further configured to cause the processor to identify one or more candidate segments having the least usage for each of the plurality of disk drives.

18. The computer program product of claim 15, wherein the plurality of disk drives are a subset of disk drives included in a redundant array of independent disks (RAID) array.

19. The computer program product of claim 15, wherein the computer readable program is further configured to cause the processor to remove the one or more identified candidate segments for each respective disk drive from the corresponding initialized segment list.

20. The computer program product of claim 15, wherein the computer readable program is further configured to cause the processor to organize the plurality of segments of the respective disk drive into a ring buffer and assign a respective index number to each of the plurality of segments of the respective disk drive in clockwise order.

* * * * *